(12) United States Patent
Bromenshenk et al.

(10) Patent No.: US 7,549,907 B2
(45) Date of Patent: Jun. 23, 2009

(54) HONEY BEE ACOUSTIC RECORDING AND ANALYSIS SYSTEM FOR MONITORING HIVE HEALTH

(76) Inventors: Jerry J. Bromenshenk, 200 Rimrock Way, Missoula, MT (US) 59803; Colin B. Henderson, 404 Keith Ave., Missoula, MT (US) 59801; Robert A. Seccomb, 2318 55th St., Missoula, MT (US) 59803; Steven D. Rice, 1802 Sundowner La., Victor, MT (US) 59875; Robert T. Etter, 4010 Fieldstone Crossing, Missoula, MT (US) 59802

( * ) Notice: Subject to any disclaimer, the term of this patent is extended or adjusted under 35 U.S.C. 154(b) by 119 days.

(21) Appl. No.: 11/651,349

(22) Filed: Jan. 8, 2007

(65) Prior Publication Data

US 2007/0224914 A1 Sep. 27, 2007

Related U.S. Application Data

(60) Provisional application No. 60/756,678, filed on Jan. 6, 2006.

(51) Int. Cl.
*A01K 47/00* (2006.01)
(52) U.S. Cl. .............................................. 449/2; 449/3

(58) Field of Classification Search ...................... 449/1, 449/2, 3
See application file for complete search history.

(56) References Cited

U.S. PATENT DOCUMENTS

| | | | | | |
|---|---|---|---|---|---|
| 2,806,082 | A | * | 9/1957 | Woods | ......................... 73/648 |
| 4,965,552 | A | * | 10/1990 | Price et al. | ................... 340/566 |
| 5,210,366 | A | * | 5/1993 | Sykes, Jr. | ...................... 84/616 |
| 5,956,463 | A | * | 9/1999 | Patrick et al. | ................ 704/232 |

* cited by examiner

*Primary Examiner*—Rob Swiatek
(74) *Attorney, Agent, or Firm*—Jean Kyle

(57) ABSTRACT

A hardware system for recording honey bee acoustics coupled with software for filtering, summarizing and analyzing acoustic data detects and identifies airborne toxics. Summary data is analyzed using routine statistical procedures to associate sound spectra with acoustic variations produced by specific airborne compounds. Honey bees produce unique acoustics upon exposure to sub-lethal concentrations of various airborne toxicants, as well as to other stressors such as predatory mites. The system profiles acoustic signatures of free-flying honey bee colonies, analyzes the resulting sounds, and identifies compounds based on specific properties of the acoustic recording, providing a solution to the problem of wide-area, atmospheric monitoring.

13 Claims, 7 Drawing Sheets ated under a research project supported by DoD, Grant No. W81XWH-04-C-0013. The government has certain rights in this invention.

HONEY BEE ACOUSTIC RECORDING AND ANALYSIS SYSTEM FOR MONITORING HIVE HEALTH

CROSS-REFERENCE TO RELATED APPLICATIONS

This application claims the benefits of U.S. Provisional Application No. 60/756,678, filed Jan. 6, 2006, the disclosure of which is hereby incorporated by reference in its entirety including all figures, tables and drawings.

The subject invention was made with government support under a research project supported by DoD, Grant No. W81XWH-04-C-0013. The government has certain rights in this invention.

BACKGROUND OF THE INVENTION

Wide-area monitoring and detection of atmospheric contaminants currently relies on distributed networks of range-limited, mechanical devices, from which cumulative specimens are collected and subjected to often laborious and expensive laboratory analysis for detection and identification of specific contaminants.

Honey bees have been used for more than 30 years to monitor for the presence of harmful chemicals, using sampling at the hive for the presence of chemicals of concern. This approach takes advantage of the widespread foraging of bees. Each colony covers an area as far as 3 miles from the hive, taking environmental samples while foraging for nectar and pollen, and returning to the hive each day where chemical sampling can occur. However, this approach requires additional, often costly, and time consuming chemical analysis.

Honey bees produce unique acoustic sounds when exposed to sub-lethal concentrations of various airborne toxicants. In addition, queenless colonies produce sounds different from those with a queen, and parasite infested colonies often produce sounds referred to as roaring. The unassisted human ear can often discern a change in the sounds produced by a bee colony, when it is subjected to stressors. However, the ability to identify stressed colonies by sound usually requires years of experience, and at best, the beekeeper only knows that something is wrong, not what is causing the altered sound production.

Currently there are no programs or devices that use the acoustic signals produced by honey bees to identify unique contaminants. All existing technologies rely on chemical traps or adsorbents to accumulate airborne compounds. These samples are then subjected to standard chromatographic or spectroscopic techniques and devices for identification. A number of new mechanical analytic devices are being developed. Additionally, a number of animal-based bio-indicator systems have been described. To date, none of the animal-based systems have been used to detect and identify suites of compounds.

All patents, patent applications, provisional patent applications and publications referred to or cited herein, are incorporated by reference in their entirety to the extent they are not inconsistent with the explicit teachings of the specification.

SUMMARY OF THE INVENTION

The subject invention involves an apparatus and system for recording honey bee sounds to monitor hive health. The subject system can determine and identify the presence of airborne toxics. Further the subject system can detect a diseased or infected hive. A microphone is placed in a hive of a free-flying bee colony to record hive sounds. These sounds are recorded and analyzed to produce a unique acoustic fingerprint which is compared to a known database of acoustic fingerprints. Comparing the hive fingerprint to the database or library of fingerprints allows the specific disease, toxin or infestation affecting the hive to be identified.

The subject system allows bees to be employed for monitoring contaminants released from ongoing toxic site cleanup. It also provides for a means for cost effective continuous surveillance of areas surrounding manufacturing and storage facilities for accidental release of potentially harmful agents. The subject system can also be used for rapid detection of intentional releases of toxic chemicals by terrorists or opposing armies or agriculturally, acoustic analysis of bee colonies can provide a fast and easy to use tool for diagnosing colonies infested with mites or infected by disease.

DETAILED DESCRIPTION OF THE INVENTION

The system of the subject invention involves profiling acoustic signatures of free-flying honey bee colonies, analyzing the resulting acoustic sounds, and identifying compounds and other stressors based on specific properties of those acoustic sounds.

By using a system of in-hive recordings of bee produced sounds, building libraries of sounds produced by healthy and stressed colonies, and analyzing resulting acoustic sounds, it is possible to detect not only when a stressor event occurs, such as exposure to a toxicant, but also something about the nature of the stressor itself. The acoustic sounds recorded provides an identification of the stressor, or category of stressor. For example, bee colonies categorized as controls, as a blank, or treated with naptha, ammonia, or toluene all produced discriminate scores that were statistically distinct. In other words, each produced a unique acoustic signature that could be distinguished from all the rest.

Figure 1:
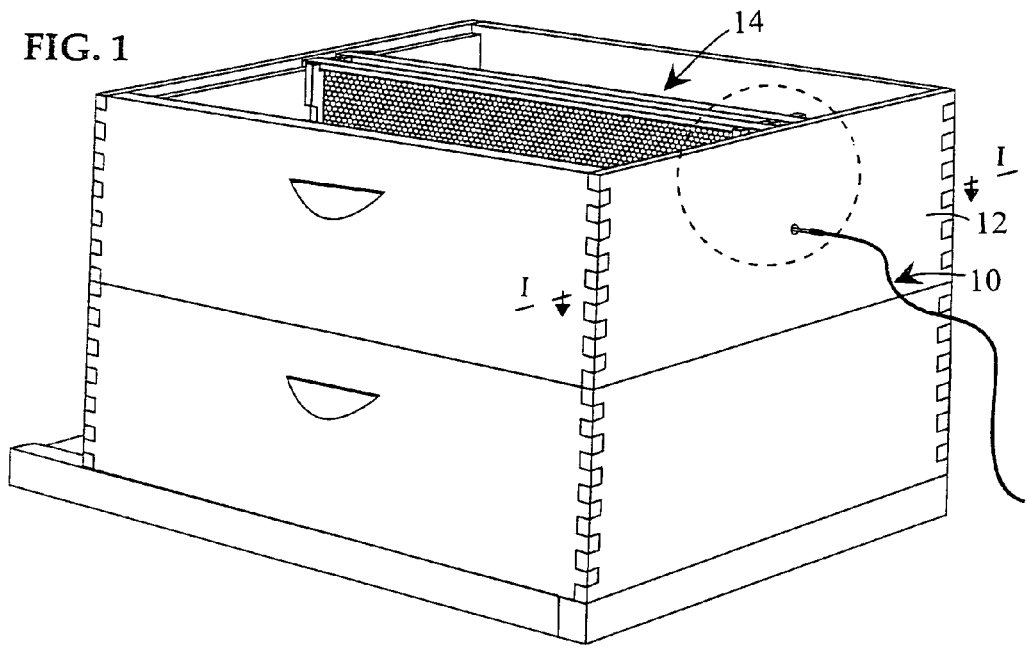
FIG. 1 is a perspective view of a preferred embodiment of the system of the subject invention installed on or in a hive.
Figure 2:
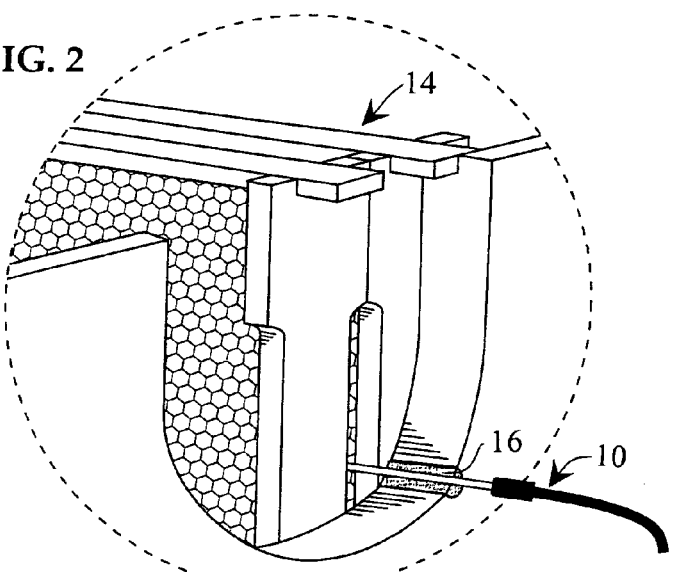
FIG. 2 is a sectional cut-away view of FIG. 1 showing insertion of the microphone into the wall of the hive box.
Figure 3:
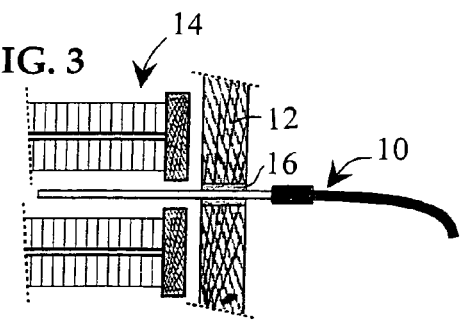
FIG. 3 is a cross-sectional view along line I-I of FIG. 1 of the insertion point in which the microphone enter the box in FIG. 2.
Figure 4:
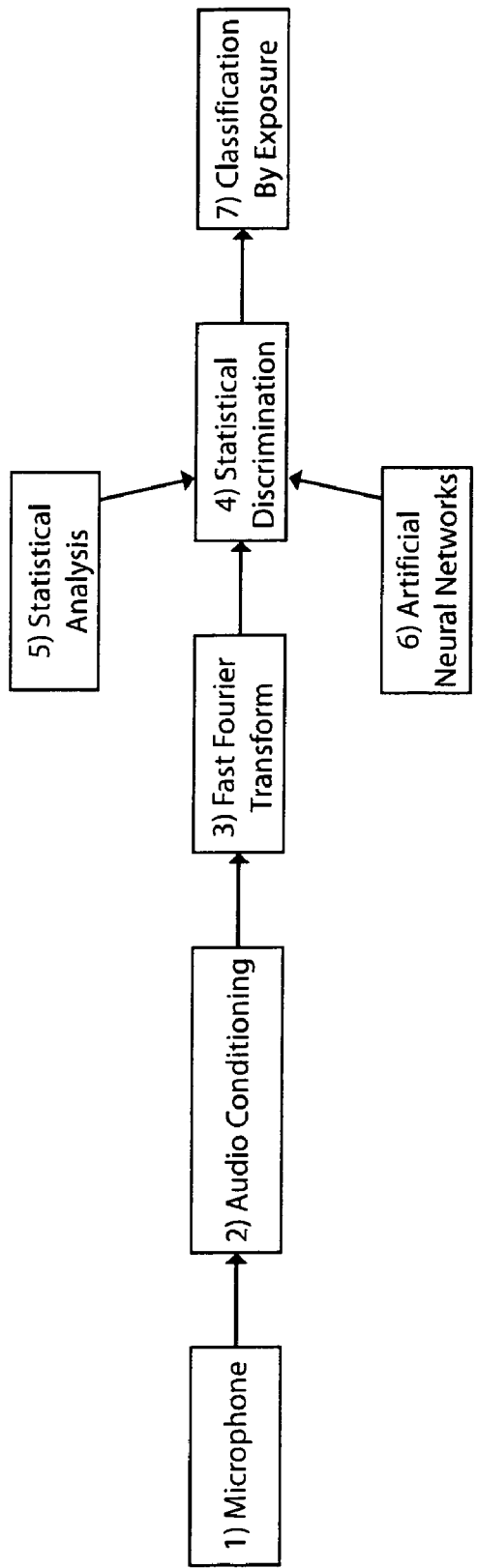
FIG. 4 is a flow chart of a preferred embodiment of the system of the subject invention.

Hive sounds can be recorded by inserting a microphone into a beehive as depicted in FIGS. 1-3. In this embodiment, the entire hardware and software system (FIG. 4) comprises purpose-built hardware for recording honey bee acoustics, coupled with software for filtering, summarizing and analyzing acoustic data. Summary data is analyzed using routine statistical procedures to associate sound spectra with acoustic variations produced by specific airborne compounds or other stressors such as mites.

FIGS. 1-3 show a preferred embodiment of the acoustic recording system for a beehive of the subject invention. Briefly, a microphone probe assembly 10 is inserted into the upper hive body box 12 of a hive of two boxes. The microphone is inserted between honeycomb frames 14. FIGS. 2 and 3 show detailed views of the insertion point of the probe microphone assembly in the hive box body including foam insulation 16 between the microphone housing and end panel of the hive body.

The system of the subject invention can be used on any size beehive, a typical unit used however is made up of two or three hive bodies, stacked vertically on top of each other. For most purposes, recording should be made in the area of the brood nest. In a beehive, this is usually the bottom 1-2 boxes.

In the exemplified embodiment, the subject data recording system comprises a small condenser microphone, an AC or DC microphone amplifier, a computer with an audio card and microphone input, and audio analyzing software. Recorders for use in the system of the subject invention include, but are not limited to, a Marantz PMD670 digital recorder. Wave files are processed by a software application that performs a Fast Fourier Transform and then exports the data to text files for analysis. Alternatively, sounds can be recorded directly to a Windows-based personal computer (PC), where the analysis can be automatically performed using an adjustable real time running average of the acoustic signal. In a preferred embodiment, a Saul Mineroff Electronics (SME) 2100 amplifier is used to amplify signal and supply phantom power to probe microphone. A SME Probe microphone with a 12 inch long condenser microphone contained in a brass tube is preferred and can be inserted deep into a beehive. A SME-200RM, small high gain condenser microphone for surface mount recording of sounds in a beehive is useful. A SME-200 battery case (1.5V Size AA) is used to supply phantom power to the SME-220RM microphone.

Figure 9:
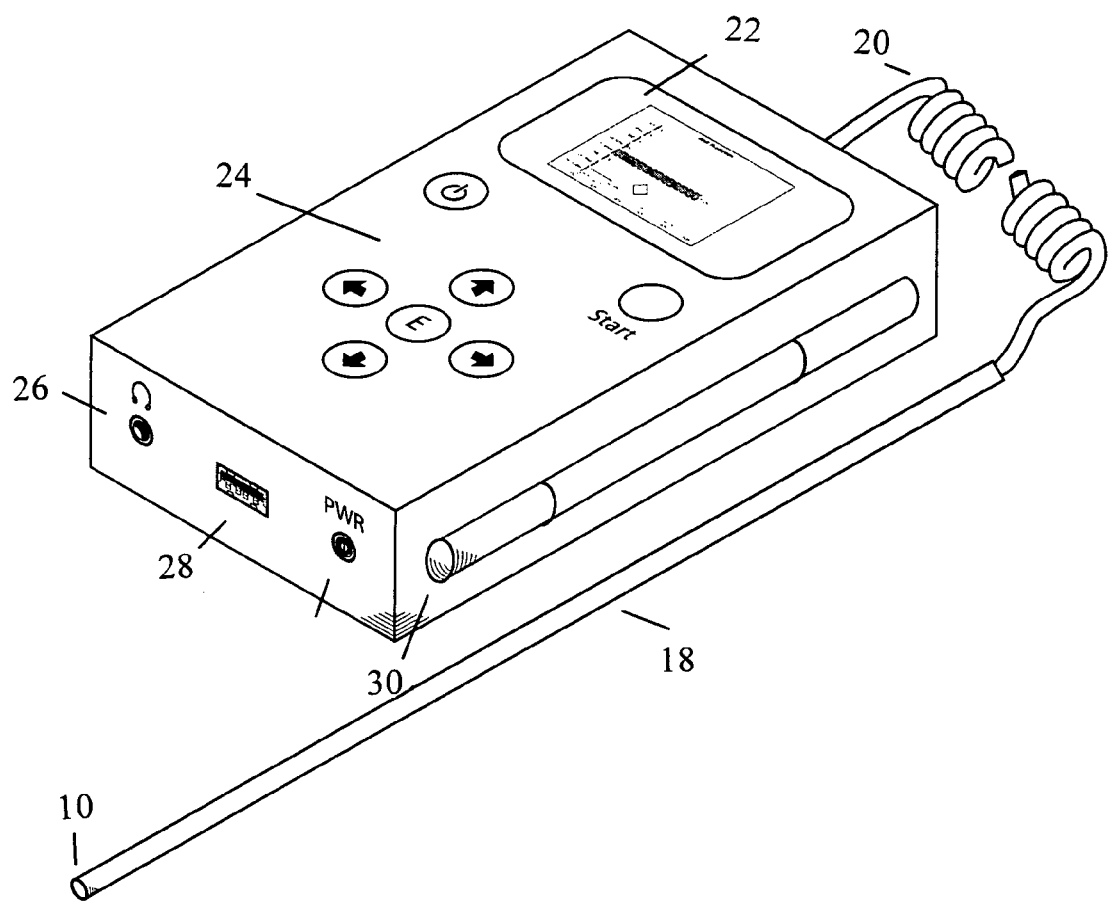
FIG. 9 is a perspective view of a preferred embodiment of a hand-held device that embodies the system of the subject invention.

In a particularly preferred embodiment, the apparatus of the subject invention is portable and self-contained to provide real-time acoustic analysis (FIG. 9). The portable device has a microphone 10, amplifier and audio input and analysis software. The unit's microphone is at the end of a probe 18 and cord 20 for insertion in the hive. Features typical of a hand-held unit including, but not limited to, a graphic interface 22, navigation buttons 24, headphone jack 26, USB port 28, and an external power or charging jack 30 can be embodied by the unit. The device can be used to monitor a number of hives in a yard. Alternatively, a separate recording unit can be incorporated into a hive for use with accessory processing units such as a desktop personal computers, laptop, notebook or PDA to analyze the sound recording.

Microphone location is the same regardless of the type of hive to be recorded. Whether using full-size ten honeycomb frame commercial (langstroth style) hives or five-frame small or nucleus hives, the microphones should be placed on the back side of the hive opposite the hive entrance location. The microphone should be placed close to the center of the hive (FIG. 1 and FIG. 2), making sure that placement is between the frame openings (FIG. 3). The elevation of the microphone on a hive body should be at least 4 inches down (where the frame narrows) from the top of the hive body, and is usually placed in the second box (the box stacked on the bottom box). This location is usually the best choice because brood frames are typically located in the lower two boxes. This is the area of the beehive characterized by the most consistent bee activity and temperature stability, since bees cluster over the brood frames and regulate the internal temperatures of this part of the hive (i.e., the brood nest). Additionally, this position, on the backside of the hive, puts the microphone the greatest distance from the entrance, so as to attenuate outside noise, while staying close to the core of the hive where the bee population is congregated in the greatest density of bees.

The microphone is inserted into the hive by drilling a hole so the outer housing, which holds the microphone, can fit securely into the side of the hive box. The microphone can be surrounded by foam or like substance and placed within an outer housing, so that vibration caused by direct contact with the box can be minimized. Depending on the type of microphone and the size of the honey bee population, the microphone can be inserted deep into the hive (probe microphone) or inserted so as to be flush with the inside of the box. The best placement is to get the microphone close to the bees, but not into the mass of bees. Bees crawling on the microphone produce noisy signals that can be difficult to filter to remove the bee contact sounds.

In the embodiment shown in FIGS. 1-3, after being inserted into the hive, the microphone is connected to an amplifier, which is then connected to the microphone input on a digital recorder or a personal computer (usually a notebook for field recordings in apiaries (beeyards). The amplifier can be AC or DC, though for minimizing noise interference and portability, DC is preferred.

When recorded via the sound card of a computer, the acoustic data is digitized by the computer. The data is then stored into buffers. Recorded hive sounds are passed through a band pass filter. A suitable filter, for example, would pass a range of 25 Hz to 400 Hz. The filtered sound is converted to a frequency spectrum. Although it is apparent to one skilled in the art that conversion can be accomplished in a number of ways, the most used method is to employ a Fast Fourier Transform (FFT). The FFT determines the frequencies and amplitudes of the signal. When recorded on a digital audio recorder, the files need to be processed by wave extraction software. The wave extraction software reads the wave files, performs a FFT, and exports the data in a format to be analyzed with statistical software.

The frequency and amplitude data is subject to statistical discrimination. For example, in a preferred embodiment the frequency spectrum is processed into two averages, the first is a running average and the second is an overall average. The main purpose is to determine a baseline or running average over a specified amount of time and to be able to see graphically when bee activity deviates from a baseline. Analysis software developed for use with the system of the subject invention continuously calculates two different averages. The running average can be explained as a moving average which represents the latest average of a specified time interval in seconds. For example, if the running average is 30 seconds, samples are taken, added, and averaged together until 30 seconds is reached. Then when each additional sample is taken the first or earliest sample is removed and the latest sample is added and averaged, therefore maintaining the latest 30 second average. The running average is valuable to minimize ambient sounds that are not reflective of the whole or general sound of the hive. The second average calculated is the total or overall average of the sampling time. The two averages are exported to text-based files and are analyzed with statistical software.

Filtered and summarized acoustic data (FIG. 5) are first analyzed using standard canonical discriminant function analysis to generate appropriate classification functions. Mean amplitudes at each frequency are subjected to a stepwise discriminant function analysis to determine the optimal set of frequencies that can construct a linear classification function that separates the different compounds. To prepare for the analysis, data from the different experiments are combined into a common set, categorized by chemical compound.

Only the first 30 seconds of acoustic data below 1000 Hz measured at approximately 6 Hz intervals are used. A forward selection process is used based on the highest significance level for entry at each step. The threshold significance for entry of any given frequency is set at a P-value of 0.02 or less.

The final classification function is then used to reclassify each group, less one case, to determine classification efficiency. Eigenvalues and significance of proportional variance explained by each discriminant function extracted from the acoustic data is used as criteria for determining the number of discriminant functions to use for differentiation of specific chemicals.

Figure 6:
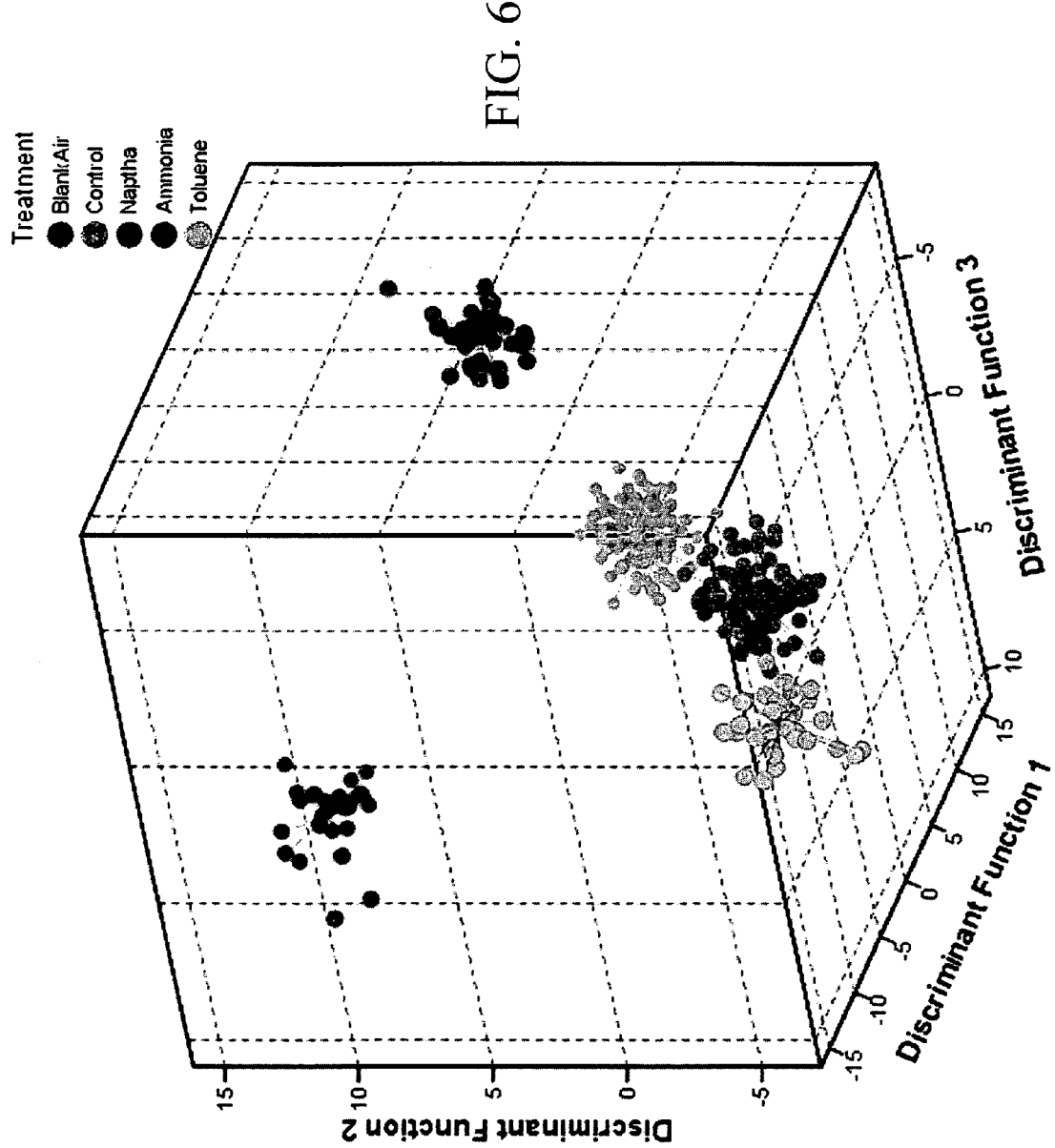
FIG. 6 is a plot of discriminant scores for three discriminant functions.

In initial tests only the first three discriminant functions were necessary to achieve 99.7 percent differentiation of different compounds. Unstandardized discriminant function scores calculated from the discriminant functions were used to compute a discriminant score for each acoustic record. Three scores corresponding to the three discriminant functions were calculated then plotted. The resulting analysis used 79 frequencies (8 percent of the acoustics) to generate four discriminant functions. The first three functions explained about 90 percent of the discriminating variance, and so even though all four were significant, further analysis was restricted to just the first three functions. FIG. 6 provides an example of this analysis for distinguishing the acoustic response to several different chemical compounds. The blanks and controls are more similar to each other than to scores for ammonia, naphtha, or toluene, and that all groups were statistically distinct. A better than ninety-five percent correct classification of a wide variety of airborne compounds has been recorded with the subject system, compounds include organophosphate pesticides, carbamates, ammonium hydroxide, naptha, carbon dioxide, and several organic solvents.

The exact method of interpreting acoustics is not restricted to discriminant analysis. Other techniques for sound pattern recognition can be employed and may include artificial neural networks. Further or different statistical methods can also be used in the subject system. Embedding the data processing on a chip, so that the analysis can occur at the hive in real time, without the need for additional recorders or a PC would be desired.

The following examples are offered to further illustrate but not limit both the compositions and the methods of the present invention. All percentages are by weight and all solvent mixture proportions are by volume unless otherwise noted.

EXAMPLE 1

Exposure of Colonies to Airborne Toxicants

Figure 5:
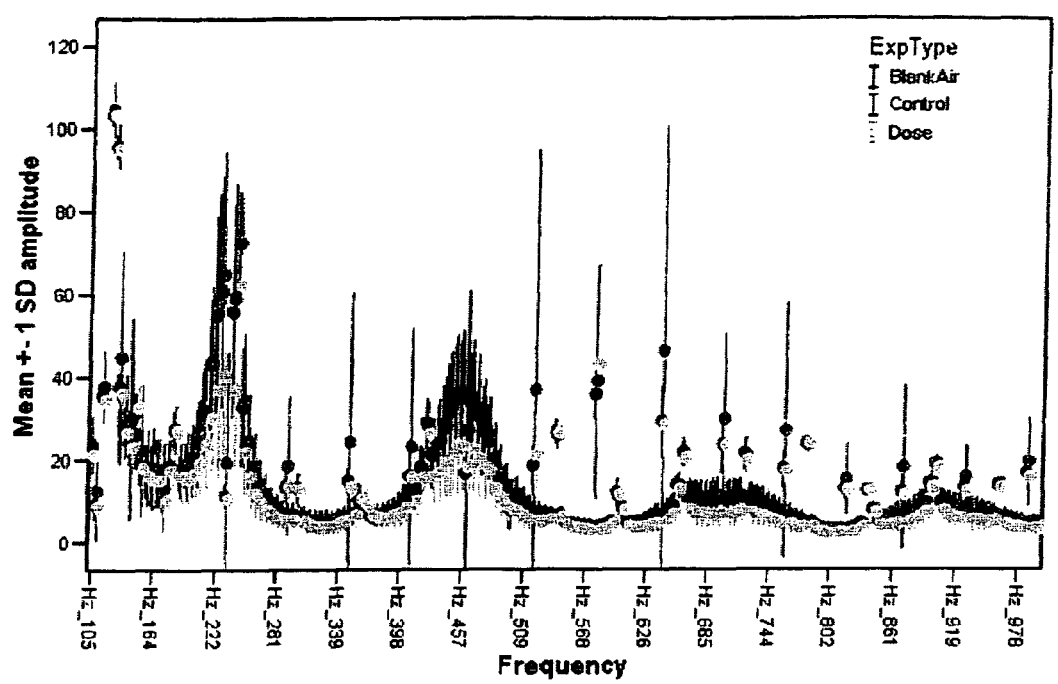
FIG. 5 shows the acoustic responses of whole beehives exposed for thirty seconds to naptha vapors.

Colonies were exposed to five millileters of toxin for five minutes. Low volatility compounds were mixed in water to the tested concentration and delivered as aerosols, while volatiles were delivered as vapors by removing the nebulizer cone from the mixing chamber. The nebulizer delivers 4-8 liters per minute flows and aerosols were delivered with a particle size of between 0.5 and 5 microns. Acoustic data were collected and processed as described above. FIG. 5 shows the acoustic response of whole beehives exposed for thirty seconds to naptha vapors introduced into the hive by a nebulizer. Means plus or minus one standard deviation were plotted for controls (no air or toxicant), blanks (air only) and the toxicant. FIG. 6 is a plot of discriminant scores for first three discriminant functions. Note that the blanks and controls were more similar to each other than to scores for ammonia, naphtha, or toluene and that all groups were statistically distinct.

EXAMPLE 2

Analysis of Diseased Colonies

Figure 7:
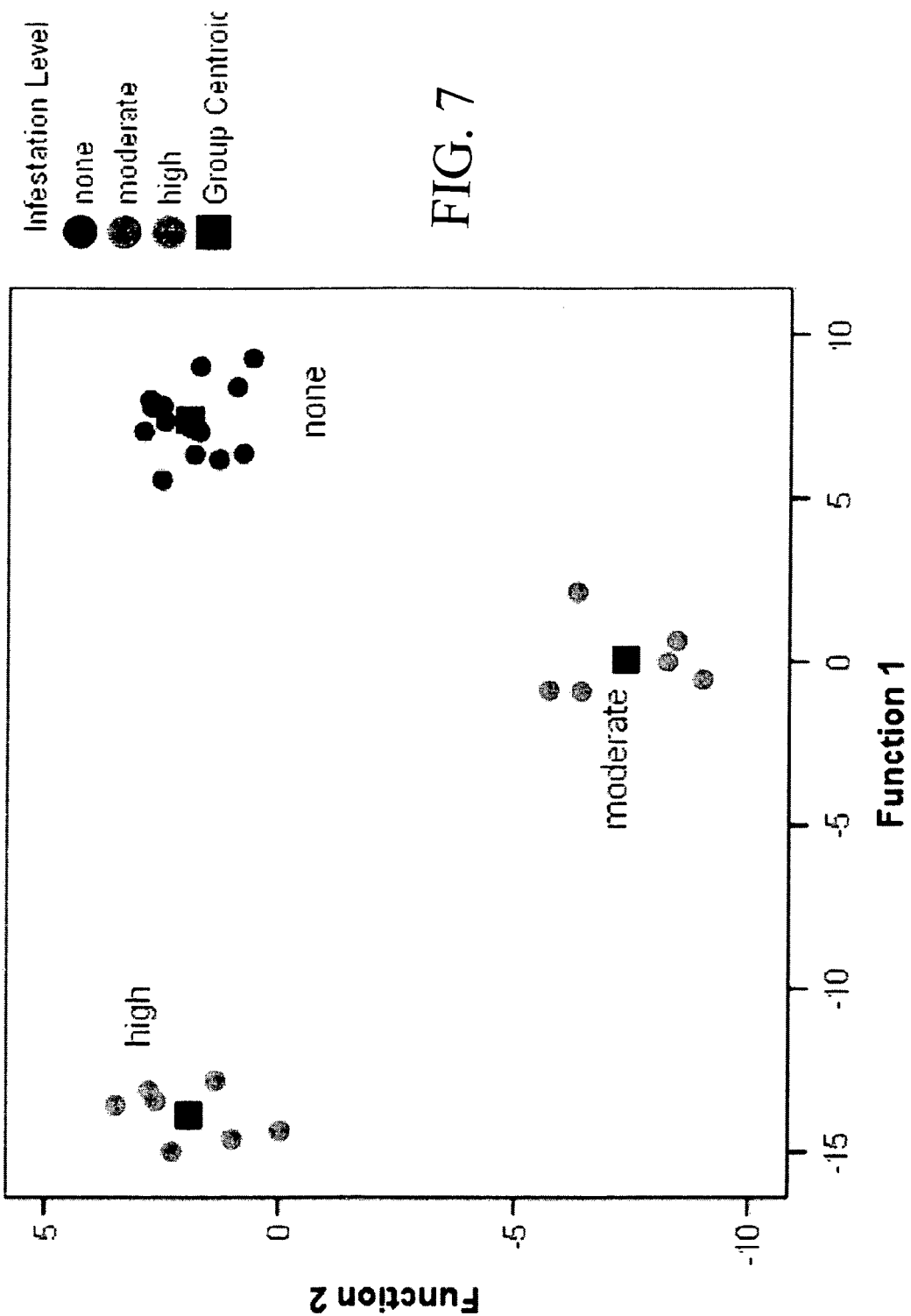
FIG. 7 is a plot of canonical discriminant scores of the acoustic signatures of honey bee colonies having different levels of varroa mite infestation.
Figure 8:
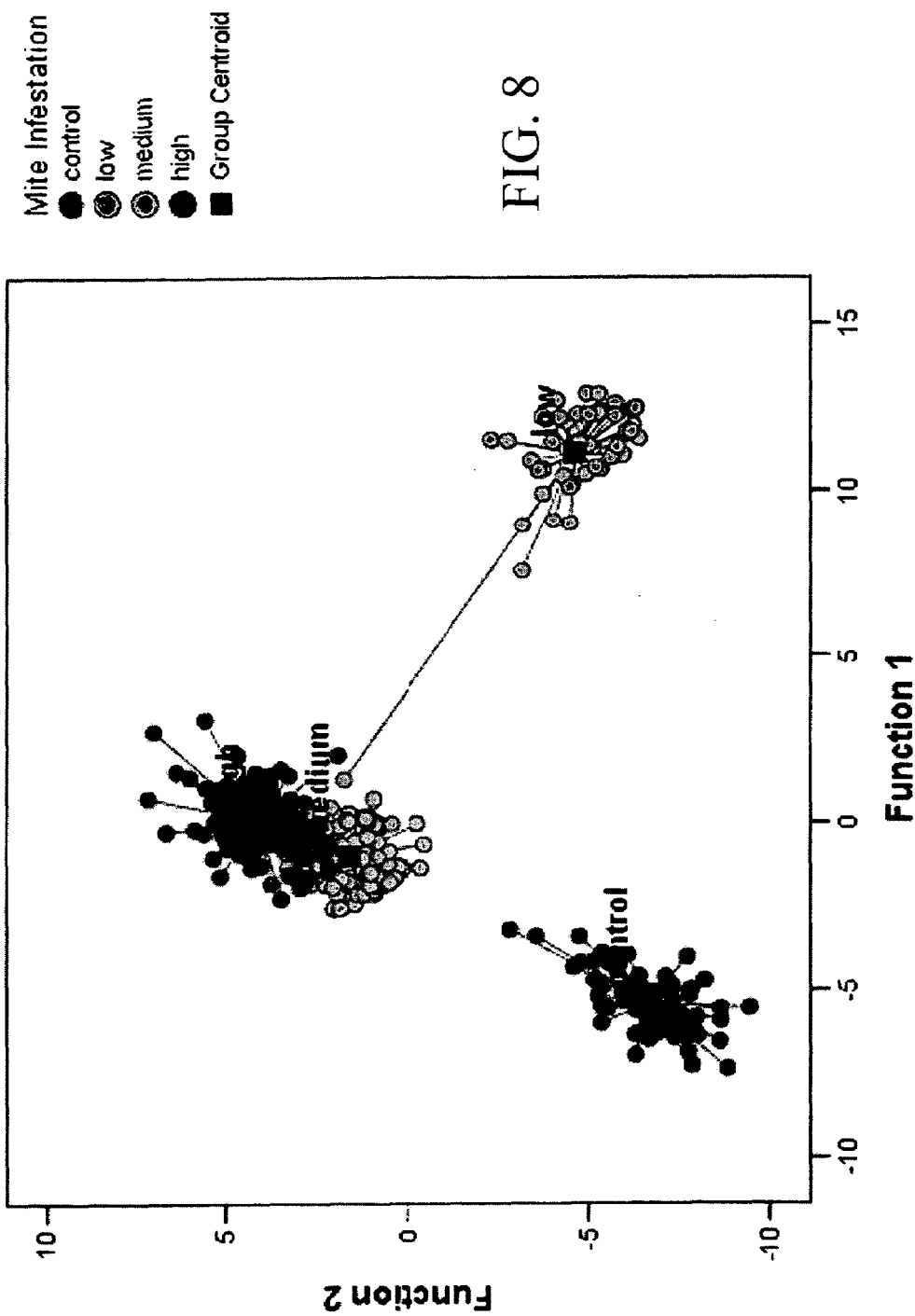
FIG. 8 is a plot of discriminant scores of the acoustic signatures of honey bee colonies having different levels of American Foulbrood infection.

Suspected diseased hives were inspected and the stressor identified. Sound recordings were made of the diseased hive for up to five minutes and the acoustic data were processed as described above. FIG. 7 shows a canonical discriminant function plot of colonies infested with different levels of the varroa mite. FIG. 8 shows a discriminant function plot of the accoustic signatures of honey bee colonies having different levels of an American Foulbrood infection. The subject system allows a user to not only identify a biological stressor but to quantify the extent of disease of the colony.

The subject system uses honey bees to both recognize that an exposure event has occurred and to characterize specific compounds associated with the event. Compounds that can be identified by the subject system include, but are not limited to, sevin, malathion, atropine, ammonia, chlorine, and toluene. The subject method can be used to monitor contaminant release from ongoing toxic clean-up sites. It can provide for cost effective continuous surveillance of areas surrounding manufacturing and storage facilities monitoring for accidental release of potentially harmful agents. All of these applications are in addition to the primary purpose of being able to detect deliberate releases of toxic chemicals by enemies of the U.S.

The system of the subject invention is also an invaluable tool for bee keepers. Diseased hives can be rapidly identified and treated with minimal disruption. Biological stressors that can be identified by the subject system include, but are not limited to, the presence of varroa mites including the level of infestation, the presence of American Foulbrood, the absence of a queen, the race of bee and the presence of hive beetle.

It is understood that the foregoing examples are merely illustrative of the present invention. Certain modifications of the articles and/or methods employed may be made and still achieve the objectives of the invention. Such modifications are contemplated as within the scope of the claimed invention.

The invention claimed is:

1. A method of monitoring a honey bee hive comprising the steps of:
    capturing hive sounds for a sampling period;
    passing the hive sounds through at least one band pass filter;
    converting the filtered hive sounds to a frequency spectrum;
    creating an acoustic fingerprint from the frequency spectrum by statistical discrimination; and
    comparing the acoustic fingerprint with known acoustic fingerprints to determine hive health.

2. The method of claim 1, wherein the method is used to determine whether the hive has been exposed to airborne toxicants.

3. The method of claim 1, wherein the method is used to determine whether the hive is diseased.

4. The method of claim 1, wherein the method is used to determine whether the hive is infested with parasites.

5. The method of claim 1, wherein the hive sounds are converted to a frequency spectrum using Fast Fourier Transform.

6. The method of claim 1, wherein said statistical discrimination is carried out by statistical analysis.

7. The method of claim 1, wherein said statistical discrimination is carried out by an artificial neural network.

8. An apparatus to monitor a honey bee hive comprising:
means to capture hive sounds for a sampling period;
at least one band pass filter through which to filter the hive sounds;
means to convert the filtered hive sounds to a frequency spectrum;
means conducting statistical discrimination to create an acoustic fingerprint from the frequency spectrum; and
means to comparing the acoustic fingerprint with known acoustic fingerprints to determine hive health.

9. The apparatus of claim 8, wherein said means to capture hive sounds for a sampling period comprises a microphone, and an amplifier.

10. The apparatus of claim 8, wherein said means to convert said hive sounds is Fast Fourier Transform.

11. The apparatus of claim 8, wherein said means conducting statistical discrimination is statistical analysis software.

12. The apparatus of claim 8, wherein said means conducting statistical discrimination is an artificial neural network.

13. The apparatus of claim 8, wherein said apparatus is hand-held.

* * * * *